(12) United States Patent
Lazarini

(10) Patent No.: US 11,396,274 B1
(45) Date of Patent: Jul. 26, 2022

(54) CIRCUIT FOR EXTERNALLY POWERING AUTHENTICATION AND HOOD UNLOCKING SYSTEMS IN VEHICLES WITHOUT DOOR KEY CYLINDER

(71) Applicant: GM GLOBAL TECHNOLOGY OPERATIONS LLC, Detroit, MI (US)

(72) Inventor: Marcelo Lazarini, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/189,351

(22) Filed: Mar. 2, 2021

(51) Int. Cl.
*B60R 25/40* (2013.01)
*B60R 25/01* (2013.01)
*B60R 25/24* (2013.01)

(52) U.S. Cl.
CPC ............. *B60R 25/40* (2013.01); *B60R 25/01* (2013.01); *B60R 25/24* (2013.01); *B60R 2325/10* (2013.01)

(58) Field of Classification Search
CPC ......... B60R 25/40; B60R 25/01; B60R 25/24; B60R 2325/10
See application file for complete search history.

(56) References Cited

U.S. PATENT DOCUMENTS

| 5,382,948 | A | * | 1/1995 | Richmond | ............. | B60R 25/10 340/5.31 |
| 7,224,259 | B2 | * | 5/2007 | Belmond | ........... | G07C 9/00309 292/201 |
| 2004/0100148 | A1 | * | 5/2004 | Kindo | ................ | B60R 16/0315 307/66 |
| 2016/0059826 | A1 | * | 3/2016 | Krishnan | ................ | B60R 25/24 340/5.6 |
| 2021/0183228 | A1 | * | 6/2021 | Yun | ...................... | B60R 16/033 |

OTHER PUBLICATIONS

Kane, Mark: "Ford Explains Mustang Mach-E E-Latch Door System: A proper new BEV has to have a fancy door opening solution right?": Insideevs; Oct. 16, 2020: https://insideevs.com/news/449199/ford-mustang-mach-e-elatch-door-system/amp/.

* cited by examiner

Primary Examiner — Thomas D Alunkal

(57) ABSTRACT

A system includes a first circuit, an authentication module, and an unlocking module. The first circuit is configured to supply power from a power source located outside a vehicle when a battery of the vehicle fails. The authentication module is configured to receive the power from the first circuit and to authorize access to the vehicle. The unlocking module is configured to receive the power from the first circuit and to unlock at least one of a hood, a door, and a trunk of the vehicle in response to the authentication module authorizing access to the vehicle.

16 Claims, 2 Drawing Sheets

CIRCUIT FOR EXTERNALLY POWERING AUTHENTICATION AND HOOD UNLOCKING SYSTEMS IN VEHICLES WITHOUT DOOR KEY CYLINDER

INTRODUCTION

The information provided in this section is for the purpose of generally presenting the context of the disclosure. Work of the presently named inventor, to the extent it is described in this section, as well as aspects of the description that may not otherwise qualify as prior art at the time of filing, are neither expressly nor impliedly admitted as prior art against the present disclosure.

The present disclosure relates to circuit for externally powering authentication and hood unlocking systems in vehicles without door key cylinder.

Nowadays most vehicles provide two ways of gaining access or entry: the old-fashioned mechanical keys used with the vehicles' door locks, and modern electronic key fobs and other wireless devices, which can perform operations including remotely locking/unlocking the vehicles, remotely starting the vehicles, etc. However, the wireless devices can perform these operations as long as the vehicles' batteries function normally. When the vehicles' batteries die, the mechanical key are useful to gain access to the vehicles and enter the vehicles.

SUMMARY

A system comprises a first circuit, an authentication module, and an unlocking module. The first circuit is configured to supply power from a power source located outside a vehicle when a battery of the vehicle fails. The authentication module is configured to receive the power from the first circuit and to authorize access to the vehicle. The unlocking module is configured to receive the power from the first circuit and to unlock at least one of a hood, a door, and a trunk of the vehicle in response to the authentication module authorizing access to the vehicle.

In another feature, the unlocking module is configured to not unlock the at least one of the hood, the door, and the trunk of the vehicle unless the authentication module authorizes access to the vehicle.

In another feature, the authentication module is configured to authorize access to the vehicle by processing a signal from a wireless device.

In another feature, the vehicle does not include a door cylinder operable by a key.

In other features, the vehicle does not include a door cylinder operable by a key. The vehicle is accessible using only a wireless device. The authentication module is configured to authorize access to the vehicle by processing a signal from the wireless device.

In other features, the first circuit comprises a voltage detector, a logic circuit, and a relay. The voltage detector is configured to detect an output voltage of the battery. The logic circuit is configured to output the power from the power source when the output voltage of the battery is less than or equal to a predetermine threshold. The relay is configured to connect the battery to the authentication module and the unlocking module when the output voltage of the battery is greater than the predetermine threshold. The relay is configured to connect the output of the logic circuit to the authentication module when the output voltage of the battery is less than or equal to the predetermine threshold.

In other features, the first circuit comprises a voltage detector, a logic circuit, and a relay. The voltage detector is configured to receive an output voltage of the battery. The voltage detector is configured to generate an output having a first state in response to the output voltage being greater than or equal to a predetermined threshold. The voltage detector is configured to generate the output having a second state in response to the output voltage being less than the predetermined threshold. The logic circuit is configured to receive the power from the power source and the output of the voltage detector. The logic circuit is configured to output the power from the power source in response to the output of the voltage detector having the second state. The relay is configured to connect the battery to the authentication module in response to the output of the voltage detector having the first state. The relay is configured to connect the output of the logic circuit to the authentication module in response to the output of the voltage detector having the second state.

In still other features, a first circuit comprises a logic circuit, a voltage detector, and a relay. The logic circuit is connected to a power source external to a vehicle. The logic circuit is configured to output power from the power source when the logic circuit is activated. The voltage detector is connected to a battery of the vehicle and to the logic circuit. The voltage detector activates the logic circuit when an output voltage of the battery is less than or equal to a predetermined threshold. The relay is connected to the battery and the logic circuit. The relay connects the battery to a second circuit controlling access to the vehicle when the output voltage of the battery is greater than the predetermined threshold. The relay disconnects the battery and connects the output of the logic circuit to the second circuit when the output voltage of the battery is less than or equal to the predetermined threshold.

In other features, a system comprises the first circuit and further comprises the second circuit. The second circuit is configured to authenticate access to the vehicle by processing a signal from a wireless device.

In other features, system comprises the first circuit and further comprises the second circuit. The second circuit is configured to not unlock at least one of a hood, a door, and a trunk of the vehicle without authenticating access to the vehicle when the relay connects the output of the logic circuit to the second circuit.

In other features, the vehicle does not include a door cylinder operable by a key. The vehicle is accessible using only a wireless device.

In still other features, a method comprises supplying power from a power source located outside a vehicle to a circuit controlling access to the vehicle when a battery of the vehicle fails, and unlocking at least one of a hood, a door, and a trunk of the vehicle in response to the circuit authenticating access to the vehicle.

In another feature, the method further comprises not unlocking the at least one of the hood, the door, and the trunk of the vehicle unless the circuit authenticates access to the vehicle.

In another feature, the method further comprises authenticating access to the vehicle by processing a signal from a wireless device using the circuit.

In other features, the method further comprises detecting an output voltage of the battery, connecting the battery to the circuit in response to the output voltage being greater than a predetermine threshold, and supplying the power from the power source to the circuit in response to the output voltage being less than or equal to the predetermine threshold.

In other features, the method further comprises detecting an output voltage of the battery, generating an output having a first state in response to the output voltage being greater than or equal to a predetermined threshold, generating the output having a second state in response to the output voltage being less than the predetermined threshold, connecting the battery to the circuit in response to the output having the first state, and supplying the power from the power source to the circuit in response to the output having the second state.

In another feature, the vehicle does not include a door cylinder operable by a key.

In other features, the vehicle does not include a door cylinder operable by a key, and the method further comprises accessing the vehicle using only a wireless device, and authenticate access to the vehicle by processing a signal from the wireless device using the circuit.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
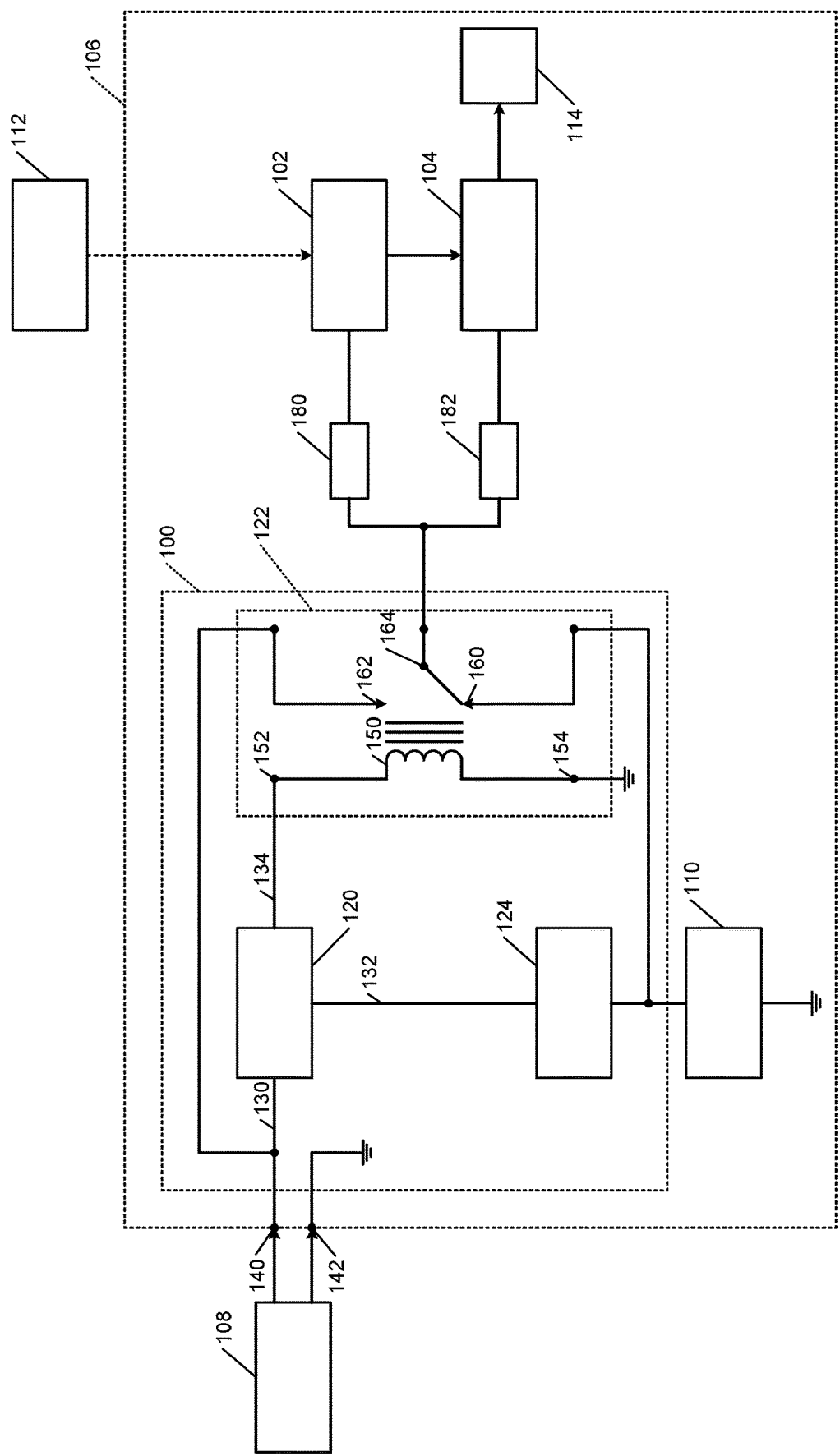
FIG. 1 shows a circuit that activates an authentication module and a hood unlocking module of a vehicle using externally supplied power.

Automotive manufacturers are eliminating use of mechanical keys and door locks from vehicles to improve aesthetics. Instead, electronic key fobs and other wireless devices are being increasingly used to remotely perform various operations such as locking and unlocking vehicles, starting vehicles, opening trunks of vehicles, etc. These wireless devices wirelessly communicate with vehicle electronics and remotely perform the various operations. However, these wireless devices work well so long as the vehicles' batteries can supply power to the vehicles' electronics. When the vehicles' batteries die, gaining access to the vehicles without mechanical keys and door locks using these wireless devices can be challenging. For example, in some vehicles, when the battery dies, simply connecting an external power source to the vehicle through the external power points of the vehicle opens the hood of the vehicle. Significantly, the hood is opened without performing any authentication, which is typically performed when the wireless device is used to access the vehicle. While granting such unfettered access to the vehicle can be convenient in emergency situations, it can also allow anyone to access and enter into the vehicle without authentication.

The present disclosure provides a circuit that supplies power to a vehicle's authentication and hood unlocking systems from a vehicle's battery during normal operation and from an external power source when the vehicle's battery dies. The circuit utilizes the vehicle's external power points, which allow attaching jumper cables to the vehicle, to supply power from the external power source to the vehicle's authentication and hood unlocking modules when the vehicle's battery dies. On receiving power from the external power source, the authentication module can authenticate signals from the user's wireless device with which the user attempts to gain access to the vehicle. Upon authentication, the hood unlocking module, which also receives power from the external power source, unlocks the vehicle's hood so that the user can gain access to the battery and can charge the battery. Notably, the circuit does not unlock the hood simply after the external power supply is connected to the vehicle unless the authentication module authenticates the signals from the user's wireless device.

The teachings of the present disclosure are not limited to unlocking only the hood of the vehicle. Rather, the teachings can be applied to unlocking and/or opening any door, trunk, hatch, sunroof/moon-roof etc. of the vehicle to gain access to and entry into the vehicle. The teachings can be used with any vehicle that does not have a conventional mechanical key-based lock, and the only way to gain access to or entry into the vehicle is by using a wireless device. Using the circuit of the present disclosure, the wireless device can be used when the battery of the vehicle operates normally as well as when the battery dies and the external power source supplies power to the circuit through the vehicle's external power points.

FIG. 1 shows a circuit 100 that powers an authentication module 102 and a hood unlocking module 104 of a vehicle 106 using power supplied by a power supply 108 external to the vehicle 106 when a battery 110 of the vehicle 106 is low or dead. The vehicle 106 does not have a door key cylinder (also called door cylinder) that can be operated by a mechanical key to gain access to the vehicle 106. Instead, a wireless device 112 such as a key fob, a mobile phone, or any other wireless device using a near-field communication system is used to gain access to the vehicle 106. The wireless device 112 transmits a signal to open a hood 114 (or any other door, trunk, etc.) of the vehicle 106. The authentication module 102 processes the signal from the wireless device 112 using power received from the power supply 108 (or from the battery 110 during normal operation) and verifies the identity of the user and/or the wireless device 112.

On verification, the authentication module 102 activates the hood unlocking module 104, which is also powered by the power supply 108 when the battery 110 is low or dead (or by the battery 110 during normal operation). On activation, the hood unlocking module 104 unlocks the hood 114 (or any other door, trunk, etc.) of the vehicle 106. If the authentication module 102 cannot not verify the identity of the user and/or the wireless device 112, the hood unlocking module 104 does not unlock the hood 114 (or any other door, trunk, etc.) of the vehicle 106 simply upon receiving power from the power supply 108 or the battery 110.

The circuit 100 comprises a combinational logic circuit 120, a relay 122, and a voltage detector 124. The combinational logic circuit 120 may include one or more logic gates. The combinational logic circuit 120 has a first input 130, a second input 132, and an output 134. The first input 130 of the combinational logic circuit 120 is connected to a first external power point 140 of the vehicle 106. An output of the power supply 108 can be connected to the first external power point 140 of the vehicle 106. When the output of the power supply 108 is connected to the first external power point 140 of the vehicle 106, the first input 130 of the combinational logic circuit 120 is connected to the output of the power supply 108 via the first external power point 140 of the vehicle 106. A second external power point 142 of the vehicle 106 is connected to a return path of the power supply 108 and is connected to ground. The second input 132 of the combinational logic circuit 120 is connected to an output of the voltage detector 124.

The relay 122 includes a coil 150 having a first end 152 and a second end 154. The output 134 of the combinational logic circuit 120 is connected to the first end 152 of the coil 150. The second end 154 of the coil 150 is connected to ground. The relay 122 includes a first contact 160, a second contact 162, and an output 164. The first contact 160 of the relay 122 is connected to an output of the battery 110 of the vehicle 106. The second contact 162 of the relay 122 is connected to the first external power point 140 of the vehicle 106. When the output of the power supply 108 is connected to the first external power point 140 of the vehicle 106, the second contact 162 of the relay 122 is connected to the output of the power supply 108 via the first external power point 140 of the vehicle 106. The output 164 of the relay 122 is connected to the authentication module 102 via a first fuse 180 and to the hood unlocking module 104 via a second fuse 182.

The output 164 of the relay 122 is normally connected to the first contact 160 of the relay 122 when the battery 110 of the vehicle 106 is operating normally (i.e., the battery 110 is not low or dead). Accordingly, during normal operation (i.e., when the battery 110 of the vehicle 106 is operating normally), the output 164 of the relay 122 supplies power from the battery 110 to the authentication module 102 and the hood unlocking module 104.

During normal operation, the voltage detector 124 detects the output voltage of the battery 110. An output of the voltage detector 124 has a first state when the output voltage of the battery 110 is greater than or equal to a predetermined threshold, which indicates that the battery 110 is not low or dead (i.e., the battery 110 is operating normally). The output of the voltage detector 124 is connected to the second input 132 of the combinational logic circuit 120. The first state of the output of the voltage detector 124 disables (i.e., deactivates) the combinational logic circuit 120. Consequently, the output 134 of the combinational logic circuit 120 does not supply power from the power supply 108 to the coil 150, which remains un-energized. As a result, the output 164 of the relay 122 remains connected to the first contact 160 of the relay 122 when the battery 110 of the vehicle 106 is operating normally (i.e., the battery 110 is not low or dead).

When the output voltage of the battery 110 becomes low (i.e., when the output voltage of the battery 110 is less than the predetermined threshold (which indicates that the battery 110 is low or dead), the output of the voltage detector 124 has a second state. The second state is opposite to the first state. The output of the voltage detector 124 is connected to the second input 132 of the combinational logic circuit 120. The second state of the output of the voltage detector 124 enables (i.e., activates) the combinational logic circuit 120.

When the combinational logic circuit 120 is enabled (i.e., when the battery 110 of the vehicle 106 is low or dead), and when the power supply 108 is connected across the first and second external power points 140, 142 of the vehicle 106, the first input 130 of the combinational logic circuit 120 receives the output of the power supply 108 via the first external power point 140 of the vehicle 106. The output 134 of the combinational logic circuit 120 has the same state as the state of the first input 130 of the combinational logic circuit 120. That is, the output 134 of the combinational logic circuit 120 follows the first input 130 of the combinational logic circuit 120. Consequently, since the output of the power supply 108 is connected to the first input 130 of the combinational logic circuit 120, the power from the power supply 108 is supplied to the first end 152 of the coil 150 via the output 134 of the combinational logic circuit 120.

When the power from the power supply 108 is supplied to the first end 152 of the coil 150, the coil 150 energizes, and the output 164 of the relay 122 switches from the first contact 160 to the second contact 162 of the relay 122. That is, the output 164 of the relay 122 disconnects from the first contact 160 and connects to the second contact 162 of the relay 122. Consequently, the output of the battery 110 is disconnected from the authentication module 102 and the hood unlocking module 104. Instead, the output of the power supply 108, which is connected to the second contact 162 of the relay 122, is connected to the authentication module 102 and the hood unlocking module 104.

However, although the hood unlocking module 104 receives power from the power supply 108, the hood unlocking module 104 does not unlock the hood 114 (or any other door or trunk) of the vehicle 106 simply upon receiving power from the power supply 108. To unlock the hood 114, the user additionally needs to request access to the vehicle 106 by pressing a button on the wireless device 112, which transmits a signal to the authentication module 102. The authentication module 102, which receives power from the power supply 108 (or from the battery during normal operation) processes the signal from the wireless device 112 and authenticates the user's request. For example, the authentication module 102 verifies the identity of the user and/or the wireless device 112.

If the authentication module 102 is able to authenticate the user's request, the authentication module 102 activates the hood unlocking module 104. Upon activation, the hood unlocking module 104, which receives power from the power supply 108 (or from the battery during normal operation), unlocks the hood 114. The user can now access the battery 110 and charge the battery 110.

In other examples, the user can similarly open a door or trunk of the vehicle 106 and gain entry into the vehicle 106 upon successful authentication by the authentication module 102. The hood unlocking module 104 does not unlock the hood 114 (or any other door or trunk) of the vehicle 106 and the user is denied access to the vehicle 106 if the authentication module 106 cannot authenticate signals from the wireless device 112. Thus, simply supplying power from the power supply 108 to the vehicle 106 does not provide access to the vehicle 106.

Figure 2:
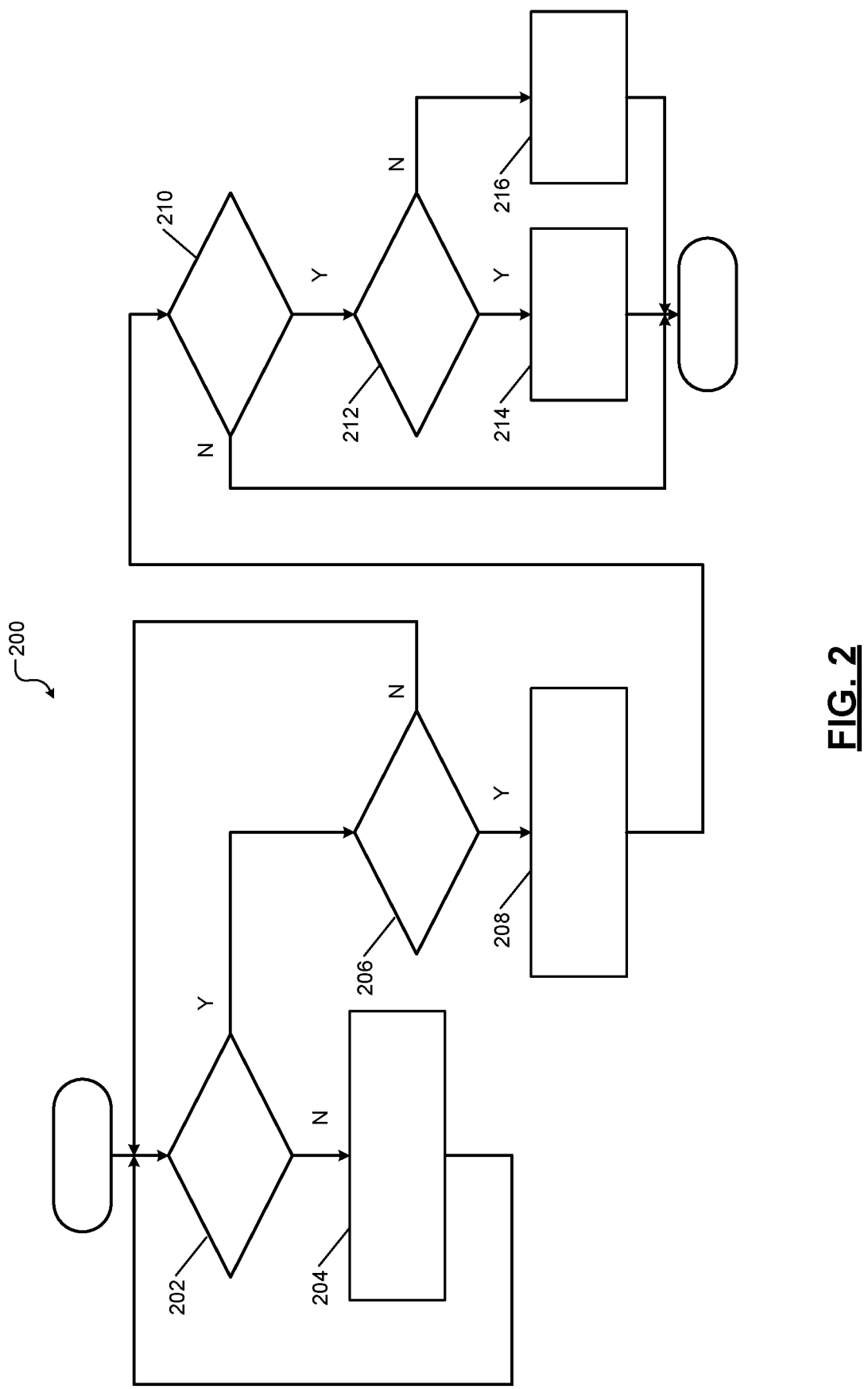
FIG. 2 shows a method for activating an authentication module and a hood unlocking module of a vehicle using externally supplied power.

FIG. 2 shows a method 200 for activating the authentication module 102 and the hood unlocking module 104 of the vehicle 106 using externally supplied power from the power supply 108. At 202, the method 200 determines whether the battery 110 of the vehicle 106 is low or dead. If the battery 110 of the vehicle 106 is not low or dead (i.e., if the battery 110 is operating normally), at 204, the method 200 supplies power from the battery 110 to the authentication module 102 and the hood unlocking module 104, and the method 200 returns to 202.

If the battery 110 of the vehicle 106 is low or dead, at 206, the method 200 determines if the external power supply 108 is connected to the vehicle 106. The method returns to 202 if the external power supply 108 is not connected to the vehicle 106. If the external power supply 108 is connected to the vehicle 106, at 208, the method 250 supplies power from the external power supply 108 to the authentication module 102 and the hood unlocking module 104.

After the external power supply 108 is connected to the vehicle 106, at 210, the method 200 determines if the user is requesting access to the vehicle 106 using the wireless device 112. The method 200 ends if the user is not requesting access to the vehicle 106 using the wireless device 112. Accordingly, the method 200 does not automatically open the hood 114 or any other door or trunk of the vehicle 106 after the external power supply 108 is connected to the vehicle 106 if the user does not request access to the vehicle 106 using the wireless device 112.

If the user requests access to the vehicle 106 using the wireless device 112, at 212, the authentication module 102 determines if the request from the user's wireless device 112 is authentic (i.e., if the identity of the user and/or the wireless device 112 can be verified) by processing the signals from the wireless device 112. If the authentication module 102 verifies the request as being authentic, at 214, the hood unlocking module 104 unlocks the hood 114 (or any other door or trunk) of the vehicle 106, and the method 200 ends by granting the user access to enter the vehicle 106. If, however, the authentication module 102 cannot verify the request as being authentic (or if the user does not request access using the wireless device 112), at 216, the hood unlocking module 104 does not unlock the hood 114 (or any other door or trunk) of the vehicle 106, and the method 200 ends by denying the user access to enter the vehicle 106.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
    a first circuit configured to supply power from a power source located outside a vehicle when a battery of the vehicle fails;
    an authentication module configured to receive the power from the first circuit and to authorize access to the vehicle; and
    an unlocking module configured to receive the power from the first circuit and to unlock at least one of a hood, a door, and a trunk of the vehicle in response to the authentication module authorizing access to the vehicle;
    wherein the first circuit comprises:
    a voltage detector configured to detect an output voltage of the battery;
    a logic circuit configured to output the power from the power source when the output voltage of the battery is less than or equal to a predetermine threshold; and
    a relay configured to:
        connect the battery to the authentication module and the unlocking module when the output voltage of the battery is greater than the predetermine threshold; and
        disconnect the battery and connect the output of the logic circuit to the authentication module when the output voltage of the battery is less than or equal to the predetermine threshold.

2. The system of claim 1 wherein the unlocking module is configured to not unlock the at least one of the hood, the door, and the trunk of the vehicle unless the authentication module authorizes access to the vehicle.

3. The system of claim 1 wherein the authentication module is configured to authorize access to the vehicle by processing a signal from a wireless device.

4. The system of claim 1 wherein the vehicle does not include a door cylinder operable by a key.

5. The system of claim 1 wherein:
    the vehicle does not include a door cylinder operable by a key; and
    the vehicle is accessible using only a wireless device,
    wherein the authentication module is configured to authorize access to the vehicle by processing a signal from the wireless device.

6. The system of claim 1 wherein:
    the voltage detector is configured to:
        generate an output signal having a first state in response to the output voltage being greater than or equal to the predetermined threshold; and
        generate the output signal having a second state in response to the output voltage being less than the predetermined threshold; and
    the logic circuit is configured to:
        receive the power from the power source and the output signal of the voltage detector; and
        output the power from the power source in response to the output signal of the voltage detector having the second state; and
    the relay is configured to:
        connect the battery to the authentication module in response to the output signal of the voltage detector having the first state; and
        disconnect the battery and connect the output of the logic circuit to the authentication module in response to the output signal of the voltage detector having the second state.

7. A first circuit comprising:
    a logic circuit connected to a power source external to a vehicle, wherein the logic circuit is configured to output power from the power source when the logic circuit is activated;
    a voltage detector connected to a battery of the vehicle and to the logic circuit, wherein the voltage detector activates the logic circuit when an output voltage of the battery is less than or equal to a predetermined threshold; and
    a relay connected to the battery and the logic circuit,
    wherein the relay connects the battery to a second circuit controlling access to the vehicle when the output voltage of the battery is greater than the predetermined threshold, and
    wherein the relay disconnects the battery and connects the output of the logic circuit to the second circuit when the output voltage of the battery is less than or equal to the predetermined threshold.

8. A system comprising the first circuit of claim 7 and further comprising the second circuit, wherein the second circuit is configured to authenticate access to the vehicle by processing a signal from a wireless device.

9. A system comprising the first circuit of claim 7 and further comprising the second circuit, wherein the second circuit is configured to not unlock at least one of a hood, a door, and a trunk of the vehicle without authenticating access to the vehicle when the relay connects the output of the logic circuit to the second circuit.

10. The first circuit of claim 7 wherein the vehicle does not include a door cylinder operable by a key and wherein the vehicle is accessible using only a wireless device.

11. A method comprising:
    supplying power from a power source located outside a vehicle to a circuit controlling access to the vehicle when a battery of the vehicle fails; and unlocking at least one of a hood, a door, and a trunk of the vehicle in response to the circuit authenticating access to the vehicle;

the method further comprising:

detecting an output voltage of the battery;

connecting the battery to the circuit in response to the output voltage being greater than a predetermine threshold; and disconnecting the battery and supplying the power from the power source to the circuit in response to the output voltage being less than or equal to the predetermine threshold.

12. The method of claim 11 further comprising not unlocking the at least one of the hood, the door, and the trunk of the vehicle unless the circuit authenticates access to the vehicle.

13. The method of claim 11 further comprising authenticating access to the vehicle by processing a signal from a wireless device using the circuit.

14. The method of claim 11 further comprising:

generating an output signal having a first state in response to the output voltage being greater than or equal to the predetermined threshold;

generating the output signal having a second state in response to the output voltage being less than the predetermined threshold;

connecting the battery to the circuit in response to the output having the first state; and disconnecting the battery and supplying the power from the power source to the circuit in response to the output having the second state.

15. The method of claim 11 wherein the vehicle does not include a door cylinder operable by a key.

16. The method of claim 11 wherein the vehicle does not include a door cylinder operable by a key, the method further comprising:

accessing the vehicle using only a wireless device; and authenticate access to the vehicle by processing a signal from the wireless device using the circuit.

* * * * *